Nov. 16, 1948. A. ARVIDSSON 2,453,960
MEANS FOR CHARGING STORAGE BATTERIES
Filed April 14, 1945

INVENTOR
Algot Arvidsson
BY
James Aiken
ATTORNEY

UNITED STATES PATENT OFFICE 2,453,960

MEANS FOR CHARGING STORAGE BATTERIES

Algot Arvidsson, Ludvika, Sweden, assignor to Allmänna Svenska Elektriska Aktiebolaget, Västeras, Sweden, a corporation of Sweden Application April 14, 1945, Serial No. 588,378
In Sweden March 23, 1944

Section 1, Public Law 690, August 8, 1946
Patent expires March 23, 1964

9 Claims. (Cl. 320—15)

It is often desirable that two storage batteries which are normally charged simultaneously should also be fully charged at the same time. In certain cases this can be accomplished simply by charging the batteries simultaneously with the same current. This is, however, not possible if the batteries have different current capacities, or if their operating conditions are such that they cannot, during charging, be connected in the same circuit. The present invention comprises a device which makes it possible in such cases to provide equal charging conditions for both batteries, so that they are always charged to the same percentage of their full capacity and thus also fully charged at the same time. The characteristic feature of the present invention is that both batteries are charged from an alternating current system each through one rectifier, and that the charging current of one of the batteries is automatically controlled by the charging current of the other.

Figure 1:
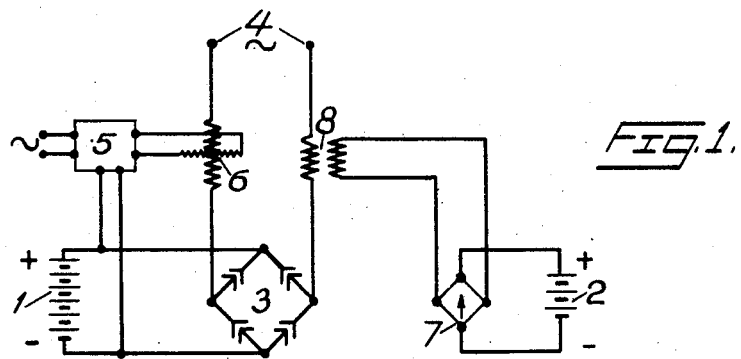
Figure 2:
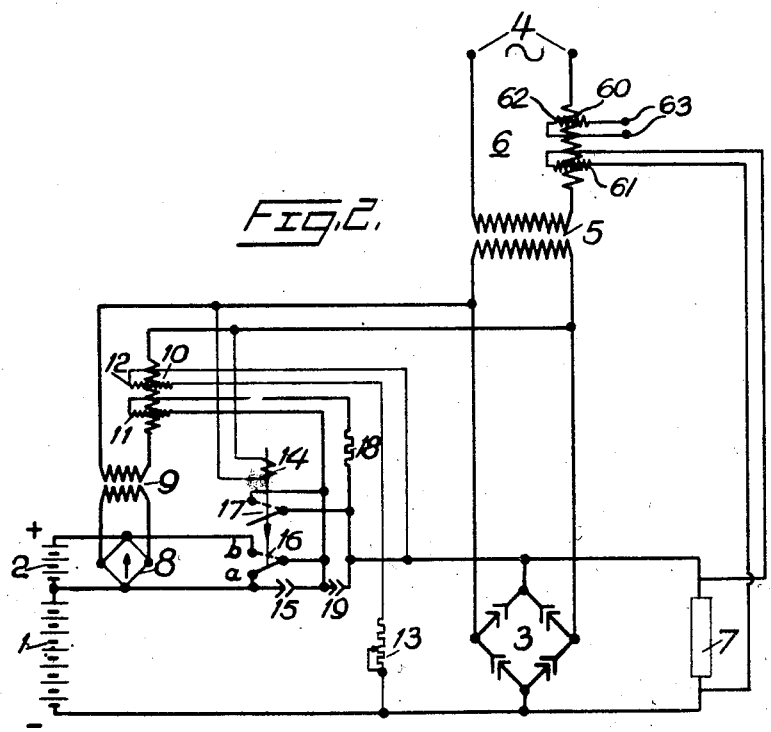

Two forms of the invention are diagrammatically illustrated in Figs. 1 and 2 of the accompanying drawing.

In Fig. 1, the numerals 1 and 2 designate two storage batteries, which for instance may be the reserve batteries for the anode voltage and for the cathode heating in an amplifier installation, for instance for a telephone connection. The batteries have entirely different voltages and different capacity, but they should always enter into function simultaneously on the occasion of a cut-out of the feeding system. The battery 1 is charged through a rectifier 3 fed from a pair of alternating current terminals 4. By means of a regulating device 5 and a direct current saturable reactor 6, the battery 1 may be charged according to a certain program, for instance with constant voltage. The battery 2 is charged through a rectifier 7, which is fed by the secondary winding of a series transformer 8, the primary winding of which is connected between the alternating current terminals 4 and the rectifier 3. In this way, the charging current of the battery 2 will always be proportional to that of the battery 1, the proportion being determined by the ratio of the series transformer. The device may also comprise devices for disconnecting the charging means from the batteries when these are discharged, but such devices are not shown. In this example, it is not possible to cause the rectifier to furnish current to another load simultaneously with the charging of the battery 1. This is, however, possible if the control of the charging current of the battery 2 is effected by means of a direct current saturable reactor instead of charging the battery through a current transformer, in analogy with the example illustrated in Fig. 2.

The invention is particularly suitable for storage batteries operating in parallel with another source of direct current and which are divided in one larger portion or main battery which is permanently connected in parallel to the direct current source and one smaller portion or auxiliary battery which is connected in series with the main battery when the latter is to serve as a reserve for the said direct current source.

A form of the invention intended for a battery divided in the manner just described and operating in parallel with a rectifier is diagrammatically illustrated in Fig. 2.

Referring to Fig. 2, the numeral 1 designates the main battery and 2 the auxiliary battery. The main battery is connected in parallel to a rectifier 3, preferably a "dry" rectifier, which is fed from alternating current terminals 4 through a transformer 5 and a regulating device 6. A load 7 is connected to the direct current terminals of the rectifier 3, which also delivers charging current to the battery 1. The voltage of the rectifier should for instance be such that a "trickle" charging of the battery 1 is obtained.

If the voltage feeding the rectifier 3 sinks too much, the auxiliary battery 2 is automatically connected in circuit by means of a relay 14. A two-way contact 15 on this relay is normally in the position marked "a" in which the load is fed only by the battery 1, but when the contact is thrown over to the position marked "b" both batteries in series feed the load. The voltage of the auxiliary battery is so proportioned that the discharge voltage of the two batteries together is practically equal to the normal voltage furnished by the rectifier 3. Thus, by connecting the two batteries in series, the voltage is kept constant when the rectifier 3 is put out of function.

When the voltage is lowered during very short periods, as of the order of magnitude of one second or less, it is not necessary to connect the auxiliary battery in series. The time limit after which the relay throws over the contact may be determined by a suitably retarded action of the relay. Such voltage lowering of short duration may be periodically repeated, as for instance if the terminals 4 are fed by an alternating current of low frequency, for instance 16⅔ cycles per second, while the rectifier 3 has no voltage smoothening means. The voltage of the rectifier then sinks below that of the battery 1 twice during each cycle. The lowering of the voltage may also be incidental such as frequently occur on electric lines. As regards such lower voltage periods of short duration the main battery thus acts as an equalizer. For instance in a train lighting installation such irregularities in the light are avoided which otherwise may occur.

The regulating device 6 may for instance act to keep the voltage on the direct current terminals of the rectifier constant. It may consist of a direct current saturable reactor 60 saturable by two saturating direct current windings 61, 62, one of these windings 61 being connected to the voltage across the load 7, and the other winding 62, which opposes the former, being connected to a source of constant voltage 63, the connection acting in the known manner to keep the load voltage constant.

For charging the auxiliary battery, a separate rectifier 8 is provided which is fed through a transformer 9 and a direct current saturable reactor 10 from a voltage source which may be the same as that of the rectifier 3; as shown. The reactor 10 is saturated by direct current through a winding 11 traversed by the charging current of the main battery and through a winding 12 fed from the direct current voltage of the rectifier. By an appropriated dimensioning of the winding 11, the charging current of the auxiliary battery can be kept in a certain proportion to that of the main battery by reason of the property of the direct current saturable reactor to admit an alternating current which is substantially proportional to the saturating direct current. Even at temporary variations in the latter, the former varies in a corresponding manner. The proportion between the two currents may be determined empirically so that the two batteries always will be fully charged at the same time. When this has been accomplished both batteries only need a very low "trickle"-charging current. The accuracy of regulation of the saturable reactor is inferior at such a low current, and further inaccuracies arise from imperfections of the rectifier 8 and of the valve 19 yet to be described, and therefore the winding 12 is useful for giving an additional saturation, by means of which the trickle charging current of the auxiliary battery is adjusted to an appropriate value. Such an adjustment can be made by means of a variable resistance 13.

The relay 14 which connects the auxiliary battery in circuit is also provided with a contact 17 which short-circuits the saturating winding 11 during the discharging operation. In parallel to the two-way contact 16 there is a unidirectional valve 15 which makes it possible to throw over the contact 16 without interrupting the current. The actuating coil of the relay 14 is, in the form shown, connected between the alternating current terminals of the rectifier 3.

A resistance 18 is connected in the charging circuit of the main battery and serves to limit the charging current in the case that the battery should have been very heavily discharged. If the rectifier 3 is provided with a current limiting device, the latter might enter into function and reduce the voltage when the battery has been too heavily discharged; this is prevented by the resistance 18. The latter is, in the form shown, connected between the saturating winding 11 and the contact 17, by which it can thus be short-circuited.

In order to prevent a saturation of the reactor 10 in the wrong sense by the aforesaid discharge currents of short duration from the main battery, a unidirectional dry valve 19 is connected in parallel to the saturating winding 11 so as to short-circuit the said winding for such current direction. At the same time, the said currents will cause no voltage drop in the winding 11 and resistance 18.

I claim as my invention:

1. Charging means for storage batteries, comprising two batteries, alternating current terminals, two rectifiers each severally connected between said terminals and a corresponding one of said batteries, and means for automatically controlling the value of the charging current from one of said rectifiers to the battery charged thereby in dependence on the value of the charging current of said other battery.

2. Charging means for storage batteries, comprising two batteries, alternating current terminals, two rectifiers each severally connected between said terminals and a corresponding one of said batteries, means for automatically controlling the value of the charging current from one of said rectifiers to the battery charged thereby according to a predetermined program, and means for automatically controlling the value of the charging current of said other battery in dependence on the value of the charging current of the former one.

3. Charging means for storage batteries, comprising two batteries, alternating current terminals, two rectifiers each severally connected between said terminals and a corresponding one of said batteries, a direct current saturable reactor connected between one of said rectifiers and the corresponding alternating current terminals, a saturating winding of said reactor traversed by the charging current of the battery fed from said other rectifier.

4. Charging means for storage batteries, comprising two batteries, alternating current terminals, two rectifiers each severally connected between said terminals and a corresponding one of said batteries, and a series transformer, the primary winding of which is connected between one of said rectifiers and said alternating current terminals, while its secondary winding feeds said other rectifier.

5. Charging means for storage batteries, comprising two batteries, alternating current terminals, two rectifiers each severally connected between said terminals and a corresponding one of said batteries, a direct current saturable reactor connected between one of said rectifiers and the corresponding alternating current terminals, a saturating winding of said reactor traversed by the charging current of the battery fed from said other rectifier, and means for connecting said two batteries in series to feed a load.

6. Charging means for storage batteries, comprising two batteries, alternating current terminals, two rectifiers each severally connected between said terminals and a corresponding one of said batteries, a direct current saturable reactor connected between one of said rectifiers and the corresponding alternating current terminals, a saturating winding of said reactor traversed by the charging current of the battery fed from said other rectifier, means for connecting said two batteries in series to feed a load, and unidirectional valve means for preventing the discharge current of the batteries from traversing said saturating winding of the reactor.

7. Charging means for storage batteries, comprising two batteries, alternating current terminals, two rectifiers each severally connected between said terminals and a corresponding one of said batteries, a direct current saturable reactor connected between one of said rectifiers and the corresponding alternating current terminals, a saturating winding of said reactor traversed by the charging current of the battery fed from said other rectifier, and means for connecting said two batteries in series to feed a load and for short-circuiting simultaneously said saturating winding of the reactor.

8. Charging means for storage batteries, comprising two batteries, alternating current terminals, two rectifiers each severally connected between said terminals and a corresponding one of said batteries, a direct current saturable reactor connected between one of said rectifiers and the corresponding alternating current terminals, a saturating winding of said reactor traversed by the charging current of the battery fed from said other rectifier, means for connecting said two batteries in series to feed a load, and a resistance connected in series with one of the batteries.

9. Charging means for storage batteries, comprising two batteries, alternating current terminals, two rectifiers each severally connected between said terminals and a corresponding one of said batteries, a direct current saturable reactor connected between one of said rectifiers and the corresponding alternating current terminals, a saturating winding of said reactor traversed by the charging current of the battery fed from said other rectifier, and other saturating winding of said reactor traversed by a substantially constant current.

ALGOT ARVIDSSON.

REFERENCES CITED

The following references are of record in the file of this patent:

UNITED STATES PATENTS

| Number | Name | Date |
| --- | --- | --- |
| 675,158 | Hubbard | May 28, 1901 |
| 1,823,780 | Banner | Sept. 15, 1931 |
| 1,897,800 | Harbecke | Feb. 14, 1933 |
| 1,916,307 | Gilson | July 4, 1933 |
| 1,934,692 | Bellamy | Nov. 14, 1933 |
| 1,967,801 | Woodbridge | July 24, 1934 |
| 2,082,607 | Amsden | June 1, 1937 |

FOREIGN PATENTS

| Number | Country | Date |
| --- | --- | --- |
| 775,892 | France | Oct. 4, 1934 |